Nov. 24, 1931.  G. C. EASTER  1,833,563

LOCK NUT

Filed Dec. 22, 1928

INVENTOR.
George C. Easter
BY William W. Varney
ATTORNEY.

Patented Nov. 24, 1931

1,833,563

UNITED STATES PATENT OFFICE

GEORGE C. EASTER, OF BALTIMORE, MARYLAND, ASSIGNOR, BY MESNE ASSIGNMENTS, TO THE VULCAN STEEL PRODUCTS COMPANY, OF BALTIMORE, MARYLAND, A CORPORATION OF MARYLAND

LOCK NUT

Application filed December 22, 1928. Serial No. 327,833.

The object of my invention is the providing a new lock nut of the grip nut type, and its application in use.

A further object of my invention is an improved process for making a lock nut of the grip nut type function on a bolt.

A further object of my invention is the process of making a nut of the grip nut type to accommodate the materials used and the requirements of the nut in use.

With the foregoing and other objects in view, my invention consists of the methods employed, combination and arrangement of systems, apparatus and means as hereinafter specifically provided and illustrated in the accompanying drawings wherein is shown the preferred embodiment of my invention, but it is understood that changes, variations and modifications may be resorted to which come within the scope of the claims hereunto appended.

I would refer to my co-pending applications, filed as follows: July 26, 1928, Ser. No. 295,403, for nut; July 30, 1928, Ser. No. 296,191, for process of forming nut bar for the manufacture of grip nuts, and October 2, 1928, Ser. No. 309,743, for nut and process for making the same, which has resulted in Patent Number 1,794,064.

Figure 1:
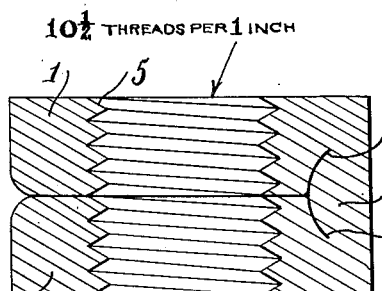
Figure 3:
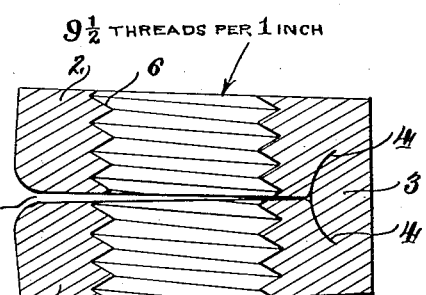
Figures 2, 4:
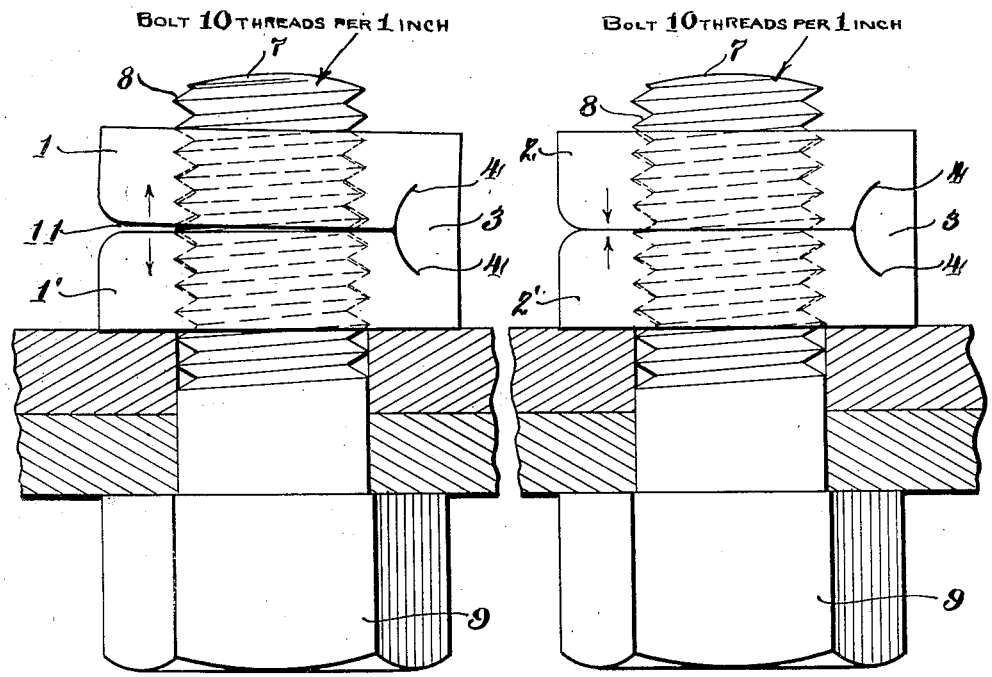

In the drawings of the herein-described embodiment of my invention, which drawings I have made substantially to scale for a particular application in order to more clearly illustrate my process, Figure 1 is a sectional view taken through a nut formed as hereinafter described from bar stock described in my previous applications; Fig. 2 is the nut shown in Fig. 1 screwed onto the bolt as used in service; Fig. 3 is a modification of the nut shown in Fig. 1, and shows the position in which it is threaded prior to use, and Fig. 4 shows the nut shown in Fig. 3 threaded on to a bolt as in use.

Similar numerals refer to similar parts throughout the several views.

1 is one part of a nut body, or blank, shown in Fig. 1. 1¹ is the other part of the nut body, or blank, shown in Fig. 1. 2 is one part of the nut body, or blank, shown in Fig. 3. 2¹ is another part of the nut body, or blank, shown in Fig. 3. 3 is a yoke. 4 are cold shots, or creases. 5 is the thread of the nut shown in Fig. 1. 6 is the thread of the nut shown in Fig. 3. 7 is a bolt, having thread 8 and head 9. 10 is a space initially in the nut blank shown in Fig. 3. 11 is a space formed in the nut shown in Fig. 1 after having been set up on bolt 7, as shown in Fig. 2, putting the nut in tension, tending to open cold shots or creases 4 and bending yoke 3. The nut blank having been initially opened, as shown in Fig. 3, thereby opening cold shot or creases 4, then being threaded is screwed on to bolt 7 as shown in Fig. 4, and in setting the same up on bolt 7 the parts 2 and 2¹ have a tendency to come together and, closing cold shot 4 closes space 10, in whole or in part and tending to bend yoke 3; this is shown in Fig. 4.

In the separating, or coming together, of parts 1 and 1¹ and 2 and 2¹, I have referred to cold shots 4 and yoke 3. I do not wish to be limited, however, to nuts having cold shots 4 on yoke 3, as my process is applicable to nuts having any means tending to keep the several parts in initial position which the bolt tends to displace.

In my previous applications, above referred to, I have shown the formation of the bar from which the nut blank is formed, and the operation of threading the nut blank and the change in the register of the threading between the two parts of the nut blank, the tap used being of standard thread corresponding with the bolt. I have discovered that by forming the nut blank into the form desired to be marketed and threading it with a proper tap slightly out of register with the bolt to be used in said nut, I accomplish the desired results the bolt placing the nuts in tension, thus avoiding considerable expense in manufacture, as well as providing a better finished product.

Using a concrete illustration of my process in its description, but not wishing to be limited in any respect thereto as the same may be varied, I will describe the process of making a nut for a ¾ bolt, standard threaded, with 10 threads per inch. In my previous applications, I would use a standard tap of 10 threads per inch tap, then spread, or contract, the nut whereby, upon threading, the two parts of the nut would be brought together or separated against the tension of the yoke of the nut and the cold shots. In this application, to accomplish the same result, I use a tap differing from the thread of the bolt depending upon the thickness of the parts of the nut and the amount of desired drag to set up the nuts; in other words, the bending or yielding of the nut involving the temper and material desired.

In the example shown in Figs. 1 and 2, I use a tap of 10½ threads per inch; that gives an almost excessive drag in threading. In the long run, I find that 10¼ threads per inch tap will probably give the best results, if the nuts are to be repeatedly used. The variation in pitch is determined by the requirements of the user as to the drag in threading and unthreading and the thickness of the nut required, the material and temper of the nut, and other operating features.

In the modification shown in Figs. 3 and 4, I use a 9½ thread per inch tap which when threaded upon a 10 thread per inch bolt draws together as shown in Fig. 4.

The thickness of parts 1 and 1¹, and 2 and 2¹, practically determine the clearance of the tap. Each of these parts will screw on to bolt 7 and practically take up back-lash when fully screwed on; 1¹ being screwed on to bolt 7 and all the back-lash of the bolt between the nut being taken up, when bolt 7 enters 1 there being no back-lash to take up, it begins to force the same away from 1¹ against the tension of the yoke of the nut; the reverse action taking place in the modification shown in Figs. 3 and 4.

In viewing Fig. 1 and Fig. 2, it will be noticed that as the parts separate they do so, as it were, on the fulcrum of the yoke, thus eccentrically changing the thread on the two sides, the one nearest and the one farthest from the yoke, thus unevenly binding the bolt which tends in use to bed itself and prevent rotation.

In standard practice the tap is about 1½ thousandths oversize and the bolt is about 1½ thousandths undersized, thus giving a back-lash between bolt and nut for easier screwing on purposes. This information is given simply to elucidate my invention, as I do not wish in anywise to be held to figures or sizes.

Having thus described my invention, what I claim and desire to secure by Letters Patent is:

1. A lock nut comprising a pair of superimposed nut portions and a resilient yoke connecting said portions tending to maintain them in a predetermined relation with respect to one another, said nut portions being provided with alined threaded openings respectively, the threads of which are of greater pitch than the threads of the member upon which the nut is adapted to be threaded.

2. A lock nut comprising a pair of superimposed nut portions and a resilient yoke connecting said portions tending to maintain them in a predetermined relation with respect to one another, said nut portions being provided with alined threaded openings, respectively, the threads of which are of a pitch different from the pitch of the threads of the member upon which the nut is adapted to be threaded.

3. A lock nut comprising a pair of superimposed nut portions and a resilient yoke connecting said portions tending to maintain them in a predetermined relation with respect to one another, said nut portions being provided with alined threaded openings respectively, the threads of which are of less pitch than the threads of the member upon which the nut is adapted to be threaded.

4. A lock nut comprising a pair of superimposed nut portions and a resilient yoke connecting said portions tending to maintain them in a predetermined relation with respect to one another, said nut portions being provided with alined uniformly threaded openings of uniform diameter, respectively, the threads of said openings being normally in pitch but different from the pitch of the threads of the member upon which the nut is adapted to be threaded.

5. A lock nut according to claim 4 in which the nut portions are normally in contact so that when used with a threaded member having threads of greater pitch said portions will be forced apart.

6. A lock nut according to claim 4 in which the nut portions are normally separated so that when used with a threaded member having threads of lesser pitch said portions will be drawn together.

GEORGE C. EASTER.